US006857354B2

(12) United States Patent
Reyhanloo

(10) Patent No.: US 6,857,354 B2
(45) Date of Patent: Feb. 22, 2005

(54) COFFEE MACHINE WITH A MANUALLY OPERATED LID OF AN INLET FOR SPECIAL COFFEE AND A METHOD FOR MONITORING THE POSITION OF THIS LID

(75) Inventor: Shahryar Reyhanloo, Lohn Ammannsegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 0 days.

(21) Appl. No.: 10/614,982

(22) Filed: Jul. 9, 2003

(65) Prior Publication Data

US 2004/0060449 A1 Apr. 1, 2004

(30) Foreign Application Priority Data

Aug. 29, 2002 (CH) .............................................. 1477/02

(51) Int. Cl.[7] .................................................. A47J 31/00
(52) U.S. Cl. .......................... 99/289 R; 99/280; 99/290
(58) Field of Search .............................. 99/286, 289 R, 99/323.3, 290, 280; 222/134, 142, 238, 236, 237

(56) References Cited

U.S. PATENT DOCUMENTS 4,665,808 A * 5/1987 Pulvermuller ................ 99/285
5,511,465 A * 4/1996 Friedrich et al. ............. 99/286
6,324,965 B1 12/2001 Star

FOREIGN PATENT DOCUMENTS

| DE | 295 08 248 U1 | 8/1995 |
| EP | 0 658 330 A1 | 6/1995 |
| FR | 745 408 A | 5/1933 |

* cited by examiner

Primary Examiner—Reginald L. Alexander
(74) Attorney, Agent, or Firm—Venable LLP; Stuart I. Smith

(57) ABSTRACT

A coffee machine with an integrated coffee grinder and a powder chute, which serves the purpose of feeding ground coffee from the coffee grinder to a movable brewing cylinder, has an inlet with a manually operated lid for already ground special coffee. A sensor detects the position of the lid. The detection signal of the sensor is passed on to a processor controlling the coffee machine, and the signal is used to differentiate between a normal operating mode and an operating mode for producing special coffee. If the lid is opened for a certain minimum time span, a subsequent coffee preparation cycle in the operating mode for producing special coffee is initialized. Since, to that end, no separate pre-selection is required any longer, the operation of the coffee machine is simplified and the susceptibility to problems is reduced.

8 Claims, 2 Drawing Sheets

COFFEE MACHINE WITH A MANUALLY OPERATED LID OF AN INLET FOR SPECIAL COFFEE AND A METHOD FOR MONITORING THE POSITION OF THIS LID

BACKGROUND OF THE INVENTION

The invention relates to a coffee machine with a manually operated lid of an inlet for special coffee and a method for monitoring the position of this lid.

In particular, the invention relates to a coffee machine, controlled by a processor, with an integrated coffee grinder and a powder chute whereby the powder chute serves as a feed line for ground coffee from the coffee grinder to a moveable brewing cylinder and, in addition, has an inlet for already ground special coffee, said inlet having a manually operated lid.

The method in terms of the invention relates to the monitoring of the position of the manually operated lid by the processor for the purpose of the correct initialisation of the operating mode for a subsequent coffee preparation cycle.

Generically similar coffee machines are known, for example, from DE-G-295 08 248.8 and EP-0 658 339. The first shows a device for dosing coffee powder, the latter a method and an arrangement for cleaning a brewing device of a coffee machine. The two documents show that the procedures for dosing, dosing control and cleaning of coffee machines with movable brewing cylinders are well known.

Since for coffee machines of this or similar construction there is always the possibility to alternatively also pour already ground special coffee through a powder chute, which is available anyway, instead of (in the coffee machine) freshly ground coffee, these machines are often equipped with an additional, manually operated flap to provide an inlet for already ground special coffee in the powder chute.

Today, many coffee machines offered commercially have indeed a manually operated flap to actually provide an inlet for already ground special coffee.

What in these cases is often solved in an unsatisfactory manner, however, is the operation and the operating sequence during the production of special coffee. Thus, in order to trigger the making of a special coffee, the selection has to be made manually at the beginning with the aid of a pre-selection via operating elements. Based on such a pre-selection, the machine 'expects' that the manual filling of special coffee via the additionally available, manually operated flap has to take place as the next operating step. Faulty operations occur particularly if the pre-selection mentioned above has not been carried out. Then there is a risk of overfilling.

SUMMARY OF THE INVENTION

It is an object of the present invention to provide a generic coffee machine which can be operated more easily and which is less prone to malfunctions.

This object is solved by embodiments of the invention.

The solution includes that a sensor is available for detecting the position of the manually operated lid of the inlet for the already ground special coffee, that the detection signal of the sensor is passed on to a processor controlling the coffee machine, and that, in addition, the detection signal is used by the processor for differentiating between a normal operating mode and an operating mode for producing special coffee. If the processor has registered, in that manner, that the lid has been open for a certain minimum time span, a subsequent coffee making cycle in the operating mode for producing special coffee will be initialised.

The advantages resulting from this can be seen, in particular, in the fact that a user who would like to have special coffee, no longer has to make a manual preselection. Rather, the coffee machine itself detects this intention automatically as a result of monitoring the manually operated lid of the inlet for the already ground special coffee. After adding special coffee to the machine, the user merely needs to determine a quantity (of water) and trigger the brewing process.

In the simplest case, the detection of this intention occurs simply by the machine registering that the manually operated lid of the inlet for the already ground special coffee has been open for a certain minimum time span. Although this does not guarantee that ground special coffee has indeed been added, it can be assumed that this would be the case in most instances. Thus, as a consequence, a coffee preparation cycle in an operating mode for producing special coffee can already be initialised.

Naturally, further measures can be provided to ensure that a filling process of adding special coffee can be detected as reliably as possible. Such measures are described in the subordinate claims.

One of these measures can be implemented in a relatively simple manner by using a generic coffee machine where the brewing cylinder can be swung into an operating position with a brewing unit, where the brewing unit has an adjustable brewing piston that can be advanced into the brewing cylinder, and where an adjustment position of the brewing piston is detectable and can be registered by the processor. In these cases, the stored adjustment position of the brewing piston in the operating mode for producing special coffee can serve the purpose of determining the presence and the present quantity of special coffee in the brewing cylinder. Namely, this is the case if the brewing piston is advanced or immersed into the brewing cylinder filled with special coffee, and the brewing piston does not reach its end position near the bottom of the brewing cylinder. Based on the immersion depth, not only can the presence of coffee in the brewing cylinder be determined, but also the current quantity of added coffee.

A further, more direct measure for determining whether a filling process with special coffee has taken place consists of placing additional detection means in the powder chute. These additional detection measures register filling processes when the lid is open. The brewing process in the operating mode for producing special coffee is initiated only if the processor, based on the signals of the additional detection means, has detected that special coffee has indeed been added. The sensors used here have to be capable of reliably detecting the filling process which makes especially high demands on the sensors in an environment which, by its nature, is subject to a considerable contamination with (coffee) powder dust, and it also usually requires additional filter methods in the processor in order to avoid or at least reduce false detections.

BRIEF DESCRIPTION OF THE DRAWINGS

A preferred embodiment for implementing the invention is subsequently explained with the aid of figures. They are.

DETAILED DESCRIPTION OF EMBODIMENTS OF THE INVENTION

Figure 1:
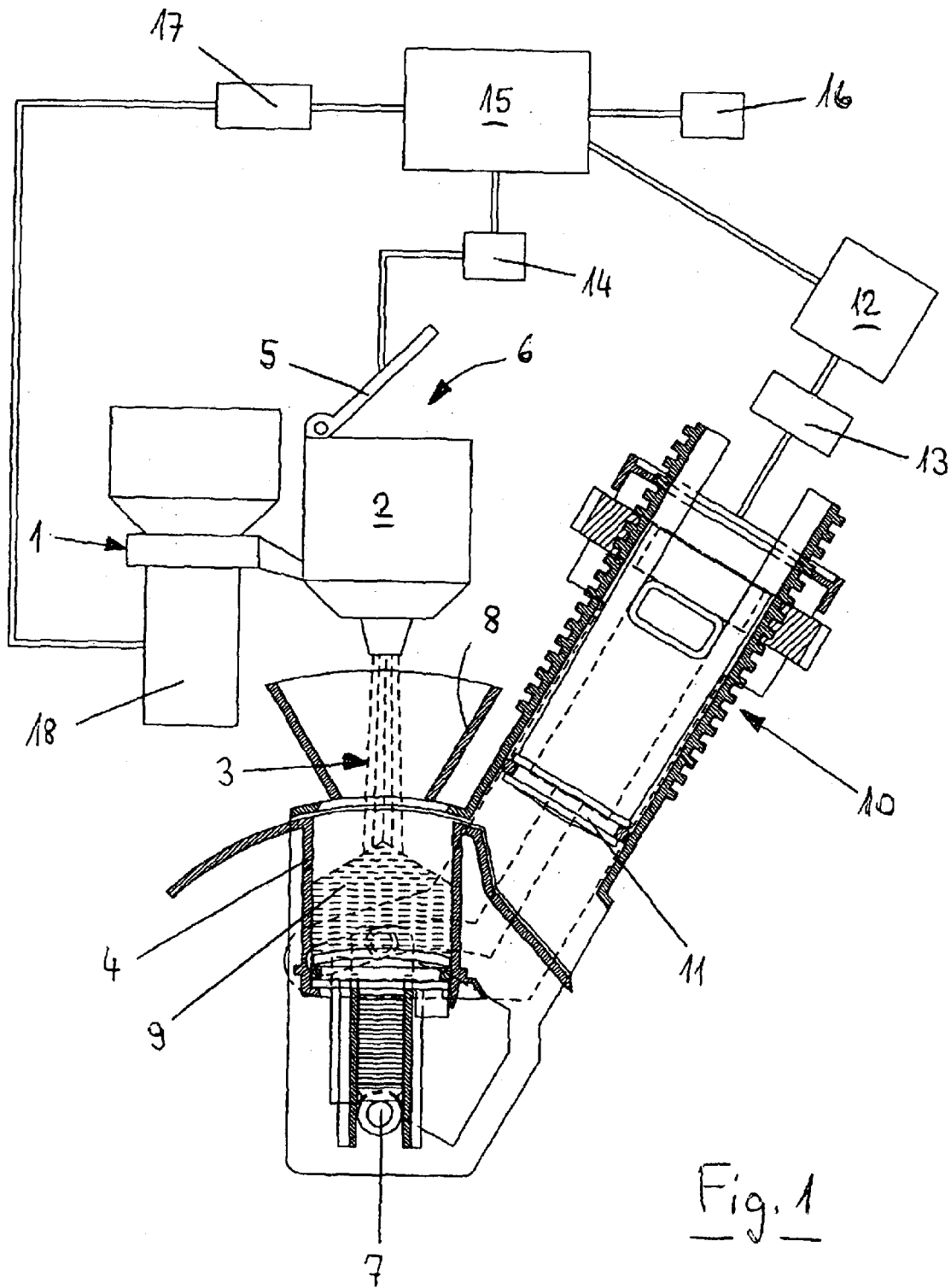
FIG. 1 a coffee machine with a manually operated lid of an inlet for special coffee with its lid being open and a brewing cylinder in filling position, and FIG. 2 a coffee machine according to FIG. 1 with the lid closed and the brewing cylinder in brewing position.

FIG. 1 shows a coffee machine in terms of the invention with an integrated coffee grinder 1 and a powder chute 2 where the powder chute serves the purpose of feeding ground coffee 3 from the coffee grinder 1 to a movable brewing cylinder 4 and is equipped with an inlet 6, provided with a manually operated lid 5, for the already ground special coffee. The lid 5 in this illustration is shown open. The brewing cylinder 4 is arranged so that it can be pivoted around a pivot point 7 and it is set in the so-called "filling position" where ground coffee (normal coffee from the coffee grinder 1 or special coffee from inlet 6) can be filled into the brewing cylinder 4 via the powder chute 2 and a feed funnel 8. Here, it is assumed that special coffee has been added via the inlet 6 and that, therefore, ground material 9 is present in the brewing cylinder 4.

The manually operated lid 5 can, for example, be designed as a flap or as a slider.

Furthermore, the coffee machine has a brewing unit 10 with a brewing piston 11 which can follow a linear motion in the brewing unit 10 and which can be extended into and retracted from the brewing cylinder 4. The brewing piston 11 can be moved and adjusted in a linear manner by a motor 12 and the adjustment position of the brewing piston 11 is detected and measured by a position encoder 13. Because in this illustration the brewing cylinder 4 is shown in the "filling position", the brewing piston 11 is retracted here and it is located in the brewing unit 10.

The position of lid 5 of the inlet 6 is monitored by a sensor 14. The sensor 14 detects the position of the lid 5 and sends a detection signal to a processor 15 controlling the coffee machine. The detection signal is used by the processor 15 to differentiate between a normal operating mode and an operating mode for producing special coffee. It is assumed that a coffee preparation cycle in an operating mode for producing special coffee should occur each time the lid 5 has been opened for a certain minimum time span.

The sensor 14 can be a common limit switch, for example, or a unit working without direct contact.

As has been mentioned, the functions and sequences of the coffee machine are controlled by the processor 15. The arrangements and connections for performing this control function are illustrated in a schematic manner only because they would be generally familiar to those skilled in the art. Thus, the processor 15 not only has connections to the motor 12 and the sensor 14, but also to a memory 16 (program and data memory), to an operating and display panel 17 and to a grinder motor 18 for the coffee grinder 1.

Figure 2:
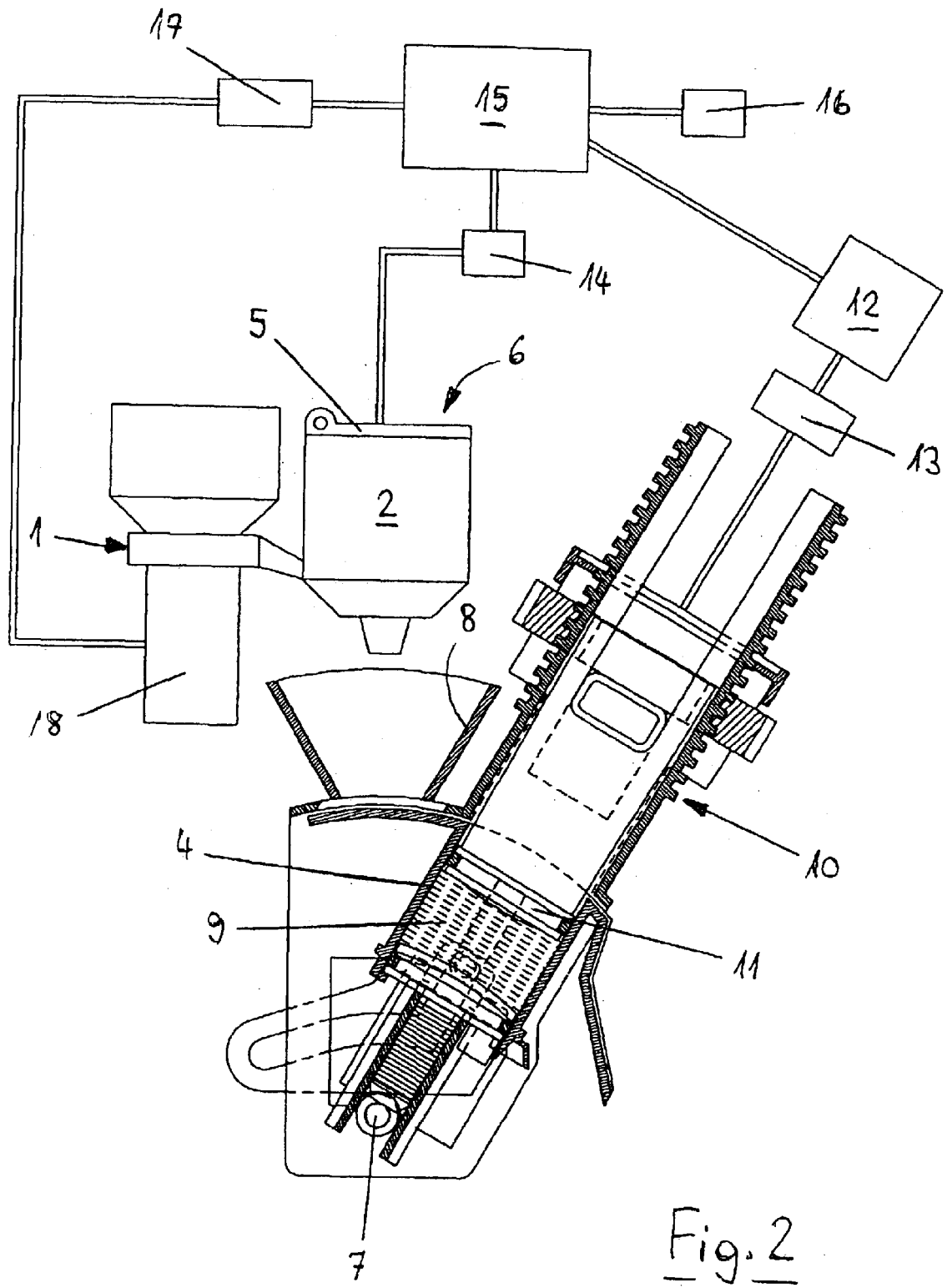

In FIG. 2, it is assumed that the filling process of adding ground coffee into the brewing cylinder 4 has been completed. The ground material 9 is present in the brewing cylinder 4. The brewing cylinder 4 has been swung into a so-called "brewing position" where the brewing piston 11 of the brewing unit 10 can be extended into the brewing cylinder 4 by motor 12. Here, the brewing piston 11 is extended to a point where the ground material 9 will be slightly compressed. The adjustment position reached by the brewing piston 11 is then measured by the position encoder 13 and passed on to the processor 15. Based on the values detected (pressure/position), the processor 15 can decide whether the parameters are within the specifications and whether the brewing process should be started.

For a brewing process with normal coffee from the coffee grinder 1, the latter delivers the 'correct' quantity of coffee so that the brewing process can normally be started without further delay.

Prior to triggering a brewing process with special coffee (added via inlet 6), the processor 15 can determine via the stored adjustment position of the brewing piston 11 (immersion depth of the brewing piston in the brewing cylinder), which itself is based on the detected measured values of the position encoder 13, whether too little or possibly too much ground material 9 has been filled in. If the brewing piston 11 reaches an end position near the bottom of the brewing cylinder, it can be assumed that obviously no ground special coffee has been added. If too much special coffee has been added, it can be expected that, for the time being, some part of the filled in special coffee remains in the feed funnel 8 and possibly causes further problems later on.

Thus, with a generic coffee machine, if it is monitored whether the lid 5 of inlet 6 remains open for a minimum time span, it merely represents an indication for the decision as to whether a special coffee should be produced. One needs to bear in mind, though, that the filling process in itself, namely the trickling through of ground special coffee through the powder chute 2 while the lid 5 is open, is not detected directly but is merely deduced as a probable subsequent process-stop. However, in most cases, the monitoring of the position and the opening duration of lid 5 of the powder chute 2 should be sufficient to achieve a satisfactory functional certainty.

But still further and in part more direct measures can be provided in order to detect the filling process for special coffee as reliably as is at all possible.

As has already been mentioned above, with generic coffee machines with adjustment positions of the brewing piston 11, which can be measured and stored, it can be detected, at least in an indirect manner, whether a filling operation for special coffee has indeed taken place. For this should be the case, precisely, when the brewing piston 11 (in brewing position) has approximately reached its specified position in the brewing cylinder 4 and has not advanced to its end position near the bottom of the brewing cylinder 4. Thus, it is possible to only start the brewing process in the operating mode for producing special coffee if the processor 15 can detect, based on a measured and stored adjustment position of the brewing piston 11, that special coffee is present in the brewing cylinder 4.

Additional detection means (not shown) in the powder chute 2 can be present, for example, which can detect the trickling through of ground special coffee through the powder chute 2 while the lid 5 is open. Such detection means can be designed as contamination-impervious light barriers, as other sensor elements operating without contact, as motion-sensitive sensor elements, or also as contact-sensitive detection means. Thus, it is possible to only start, the brewing process in the operating mode for producing special coffee if the processor 15 can detect, based on the signals of the additional detection means, that special coffee has been added.

Since the detection means mentioned above are naturally exposed to a considerable contamination with (coffee) powder dust, it makes especially high demands on the sensors and, furthermore, it also requires the application of additional signal filter methods in the processor in order to avoid or at least reduce false detections.

Needless to say, the proposed measures can be implemented either individually or in combination.

Reference Number List

1 Coffee grinder
2 Powder chute
3 Ground coffee
4 Brewing cylinder
5 Lid
6 Inlet
7 Pivot point
8 Feed funnel
9 Ground material
10 Brewing unit
11 Brewing piston
12 Motor
13 Position encoder
14 Sensor
15 Processor
16 Memory
17 Operating and display panel
18 Grinder motor

What is claimed is:

1. A coffee machine with an integrated coffee grinder (1) and a powder chute (2) where the powder chute (2) serves the purpose of feeding ground coffee (3) from the coffee grinder (1) to a movable brewing cylinder (4) and has an inlet (6) with a manually operated lid (5) for already ground special coffee, characterised in that a sensor (14) is present for detecting he position of the lid (5) and a detection signal of the sensor (14) is passed on to a processor (15) controlling the coffee machine and the detection signal is used by the processor (15) for differentiating between a normal operating mode and an operating mode for producing special coffee.

2. The coffee machine according to claim 1, characterised in that the brewing cylinder (4) can be swung into an operating position aligned with a brewing unit (10), that the brewing unit (10) has au adjustable brewing piston (11) that can be extended into the brewing cylinder (4) whereby an adjustment position of the brewing piston (11) can be measured and then registered by the processor (15) and where the stored adjustment position of the brewing piston (11), in the operating mode for producing special coffee, has the purpose of detecting the presence and the current quantity of special coffee in the brewing cylinder (4).

3. The coffee machine according to claim 1, characterised in that the lid (5) is either a flap or a slider.

4. The coffee machine according to claim 1, characterised in that the sensor (14) is a limit switch or a component operating in a non-contact manner.

5. A method for monitoring the position of a lid (5) of an inlet (6) of a powder chute (2) on a coffee machine according to patent claim 1, controlled by a processor (15), characterised in that a subsequent coffee preparation cycle in an operating mode for producing special coffee is initialised in case of the registration by the processor (15) that the lid (5) has been opened for a certain minimum time span.

6. The method according to patent claim 5 for a coffee machine where the brewing cylinder (4) can be swung into an operating position aligned with a brewing unit (10), that the brewing unit (10) has an adjustable brewing piston (11) that can be extended into the brewing cylinder (4) whereby an adjustment position of the brewing piston (11) can be measured and then registered by the processor (15), characterised in that the brewing process in the operating rode for producing special coffee will only be initiated if the processor (15), based on a measured and stored adjustment position of the brewing piston (11), has detected that special coffee is present in the brewing cylinder.

7. The method according to patent claim 5, characterised in that additional detection means are present in the powder chute (2), by which it is possible to determine whether special coffee is being added while the lid (5) is open, and that the brewing process will only be initiated if the processor (15), based on the signals of the additional detection means, has found that special coffee has been added.

8. The method according to patent claim 7, characterised in that the additional detection means present in the powder chute (2) are contamination-impervious light barriers, other sensor elements operating without contact, motion-sensitive sensor elements, or also contact-sensitive detection means, and that filter methods are used in the processor (15) in order to avoid or reduce fuse detections of filling processes.

* * * * *